May 12, 1942.   E. E. WEMP   2,283,113
CLUTCH DISK
Original Filed Jan. 7, 1939
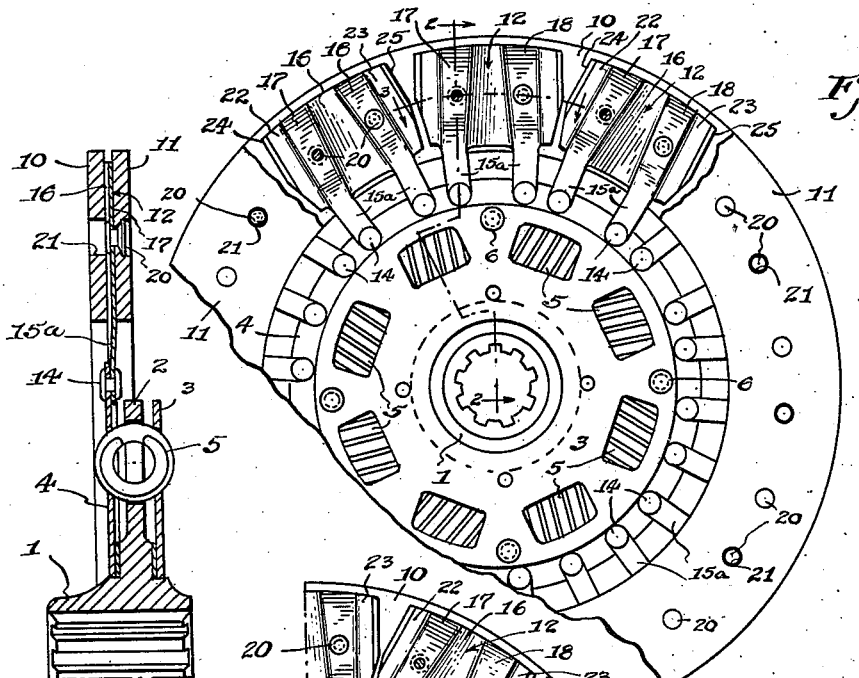
Fig. 1
Fig. 2
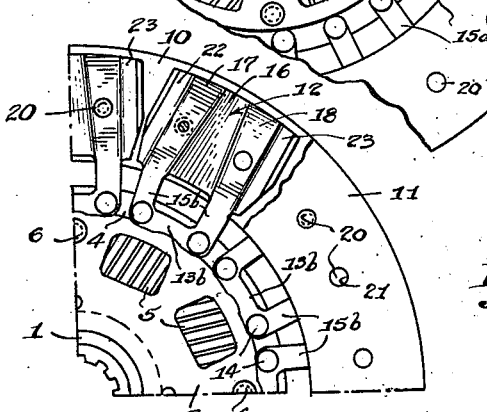
Fig. 5
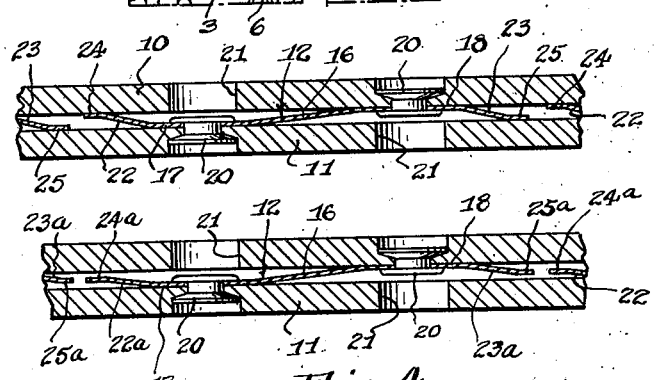
Fig. 3
Fig. 4
INVENTOR.
Ernest E. Wemp.
BY Barnes, Kisselle, Laughlin & Raisch
Attorneys Patented May 12, 1942

2,283,113

UNITED STATES PATENT OFFICE 2,283,113

CLUTCH DISK

Ernest E. Wemp, Detroit, Mich.

Original application January 7, 1939, Serial No. 249,697. Divided and this application May 10, 1941, Serial No. 392,849

5 Claims. (Cl. 192—107)

This invention relates to a clutch disk of the cushion type adapted to be packed between clutch driving members. In an automotive vehicle, for example, a disk of this type is ordinarily attached to a driven shaft and the disk is engaged with pressure between the engine flywheel and an axially shiftable pressure plate mounted to rotate with the flywheel, the flywheel and pressure plate constituting driving members. This application is a division of application Serial No. 249,697, filed January 7, 1939.

In accordance with this invention structurally separate spring metal cushion members are mounted upon a body which may be in the form of a disk, and the cushion members serve to hold oppositely positioned facing rings yieldably separated. A feature of the invention is an arrangement wherein an increased number of points of yieldable support is afforded for each facing; that is to say the number is increased over cushion arrangements in the prior art which will be hereinafter referred to, with the result that the greater number of points of support, or rather locations of support, decreases the unit pressure at localized points on the facing during clutch engagement, and this decreases the tendency for the clutch to chatter or grab.

These and other features and objects will be better understood as the detailed description progresses.

In the drawing:

Fig. 1 is an elevational view of a clutch disk constructed in accordance with the invention with part of one facing cut away to show the underlying cushion member.

Fig. 2 is a cross sectional view taken substantially on line 2—2 of Fig. 1.

Fig. 3 is an enlarged sectional view substantially on line 3—3 of Fig. 1.

Fig. 4 is an enlarged sectional view similar to Fig. 3 showing a modified arrangement.

Fig. 5 is a partial elevational view of a modified form.

In the structure illustrated the driven member has a hub 1 arranged to be splined to a driven shaft. The hub has a flange 2 on one side of which is a washer member 3 and on the other side of which is a disk 4. The flange, washer and disk have aligned apertures in which coil springs 5 are located. This forms a cushioning or vibration dampening drive between the disk and the hub. The disk and washer are secured together to move in unison through the means of rivets 6, the rivets passing through clearance slots (not shown) in the flange 2. Friction material 7 may be disposed between the flange and the washer and the disk. The structure thus far described may correspond substantially to my Patent No. 2,042,570 and need not be further described. Such a vibration dampener construction may or may not be used with the cushion structure about to be described.

As will be noted, the disk 4 terminates radially inwardly of two friction facing rings 10 and 11, while structurally separate cushion members 12 are disposed between the facings. These cushion members are preferably of relatively light gauge spring steel stock, that is, relatively light as compared to the disk.

Each cushion member has two spoke-like elements 15a which are connected to the disk by rivets 14, and a circumferentially enlarged head portion preformed so as to normally and yieldably hold the facings axially separated. The head of each cushion member is shaped substantially as illustrated in Fig. 3. The central portion 16 is disposed angularly relative to the disk and the facings, or relative to the plane of rotation. The head is shaped to provide a land 17 on one side of the central portion and a land 18 on the other side thereof, these lands constituting high spots for contact with the facings and for connection to the facings by rivets 20 or the like. Each facing may be provided with clearance apertures 21 for clearing the heads of the rivets for attaching the opposite facing. The cushion members, as shown in Fig. 3, have portions 22 and 23 which extend angularly across the space between the facings, with the extreme end portions preferably flattened or fashioned as shown at 24 and 25 for contact as with one of the facings. Since the lands are in different planes, the spokes are slightly formed or twisted to bring their inner ends into a common plane for attachment to the disk as shown in Fig. 2. The form shown in Fig. 5 is similar to that shown in Fig. 1 except that the neck or spoke portions are not separate but are constituted by separate arms or a U-formation. The bight portion of the U is illustrated at 13b, while neck or spoke portions which are integral therewith are illustrated at 15b.

In the modified form shown in Fig. 4, the facings and rivets are the same and bear the same reference characters. However, the portions 22a and 23a do not extend entirely across the space between the facings, thus leaving the extreme end portions 24a and 25a normally free of one facing.

The function and operation of the disk is substantially as follows: In a normal unrestrained condition, the facings may be visualized as being held yieldably spaced substantially as shown in Fig. 3. When the facings are packed between driving members, the cushion members have a collapsing action and the facings are yieldably pressed toward each other. In this action the central portion 16 and the spokes 15a are twisted torsionally as the forces tend to bring the angular portion 16 into a plane paralleling the facings. At the same time a bending action occurs; in this connection note that the facing 10 is supported by the land 18 which in turn gets its yielding support from the end 25 and the land 17. This structure resists collapsing action and the collapsing forces tend to bend and straighten out the formation. Now note that the facing 11 is similarly supported at land 17.

This cushion structure is advantageous in that when the cushion members are located in an annular array on a given radius, an increased number of points or locations of support for the facings are provided over prior art structures. Each cushion member in the structure shown provides arch structures for supporting each facing, one extending from the end 25 to the land 17, and the other extending from the end 24 to the land 18. Thus the intermediate portion 16 is a common element which is advantageous. For example, in one structure which has been manufactured, the cushion member had a circumferential dimension of about 2 inches and the distance between the points of support was about 1½ inches. As a matter of comparison this may be considered with the structure shown in my Patent No. 2,117,527 of May 17, 1938. A manufactured structure in accordance with this patent had a cushion member of about $3\frac{7}{16}$ of an inch in circumferential dimension, with the distance between the points of support of about 1½ inches, and a center relatively inert land of $\frac{7}{16}$ of an inch for attachment purposes.

A large number of cushion members of the type shown herein may be disposed in an annular array on a given radius, and this provides a large number of points or locations of support for the facings. These points or locations yieldably resist compression action during clutch engagement, and as a result there is an increased area on the facings which resists compression and a correspondingly decreased unit pressure. These things contribute to a smoothly acting clutch and decrease a tendency for the clutch to chatter or grab during clutch engagement.

Moreover, in a clutch with a given radius, the distance between points of support may be of adequate length without decreasing the number of supporting points. It will be understood, of course, that where the distance between supporting points is short the resistance to flexure is increased. As a result the stock of which the cushion member is made need not be so thin, and accordingly, the desired type and gauge of stock may be employed.

The same thing is true of the form shown in Fig. 4, except that some of the metal does not begin to function until the collapsing action brings the ends 24a and 25a into contact with the respective facings.

I claim:

1. A clutch driven member comprising two annular friction facing members adapted to be packed between clutch driving members, a body member with its outer peripheral edge disposed within the inner peripheral edges of the facing members, a plurality of metal cushion members arranged in an annular array, each cushion member having an enlarged outer portion lying between the facings, the outer portion being preformed to yieldably space the facings and having an intermediate angularly disposed part extending diagonally across the space between the facings, lands for the facings on opposite sides of the intermediate part and end portions extending in a direction diagonally of the space between the facings, inwardly disposed projections extending substantially from the said lands and secured to the body member, and means securing the respective facings to the lands.

2. A clutch driven member comprising, two annular friction facing members adapted to be packed between clutch driving members, a body member with its outer peripheral edge disposed within the inner peripheral edges of the facing members, a plurality of metal cushion members arranged in an annular array, each cushion member having a circumferentially enlarged outer portion lying between the facings, the outer portion being preformed to provide axially spaced lands for engaging opposite facing members and which are connected by a yieldable intermediate portion to yieldably space the facings axially, spoke-like elements extending inwardly substantially from the lands and joining to the body member, and means for securing the facings to the respective lands.

3. A clutch driven member comprising, two annular friction facing members adapted to be packed between clutch driving members, a body member with its outer peripheral edge spaced inwardly from the inward peripheral edges of the facings, a plurality of metal cushion members arranged in an annular array, each cushion member having a circumferentially enlarged outer portion lying between the facings, the outer portion being preformed to provide axially and circumferentially spaced lands for engaging opposite facing members and which are connected by a yieldable intermediate portion to yieldably space the facings axially, a spoke-like element extending inwardly substantially from each land across the space and joining to the body member, and means for securing the facings to the respective lands.

4. A clutch driven member comprising two annular friction facing members adapted to be packed between clutch driving members, a body member with its outer peripheral edge spaced inwardly from the inner peripheral edges of the facing members, cushion members arranged in an annular array, each cushion member having an outer portion lying between the facings; each outer portion being preformed to provide a yieldable central portion, a land on each side of the central portion, said lands being spaced axially and adapted to engage opposite facing members, and edge portions projecting from the lands and disposed diagonally in a direction across the space between the facing members; means for securing the facing members to the respective lands, and two spoke-like elements for each cushion member extending inwardly from the lands and having their inner portions joined to the body member.

5. A clutch member comprising a body member, a pair of annular friction facings disposed radially outwardly of the body member, a plurality of cushion members disposed in an annular array and having outer portions lying between and normally holding the facings yieldingly spaced apart axially, the outer portion of each cushion member comprising a sheet metal body fashioned into a yieldable formation having an intermediate portion extending angularly across the space between the two facings and having a land at opposite sides of the intermediate portion, each for engaging one of the facings, and end parts extending from the lands angularly crosswise of the space between the facings and each adapted to engage the facing toward which it extends, whereby each facing is supported by a land and one end portion of a cushion member, means for securing the facings to the lands, and each cushion member having two yieldable spoke-like elements extending inwardly substantially from the lands and connecting to the body member.

ERNEST E. WEMP.